(12) United States Patent
Agarwala et al.

(10) Patent No.: US 9,972,107 B2
(45) Date of Patent: May 15, 2018

(54) AUTOMATED DECOMPOSITION OF GRAPHIC DESIGNS

(71) Applicant: ADOBE SYSTEMS INCORPORATED, San Jose, CA (US)

(72) Inventors: Aseem Agarwala, Seattle, WA (US); Mohammad Amin Sadeghi, Urbana, IL (US); Aaron Phillip Hertzmann, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days. days.

(21) Appl. No.: 14/726,112

(22) Filed: May 29, 2015

(65) Prior Publication Data
US 2016/0350954 A1 Dec. 1, 2016

(51) Int. Cl.
  *G09G 5/00* (2006.01)
  *G06T 11/60* (2006.01)
  *G06K 9/00* (2006.01)

(52) U.S. Cl.
  CPC ............ *G06T 11/60* (2013.01); *G06K 9/00* (2013.01)

(58) Field of Classification Search
  None
  See application file for complete search history.

(56) References Cited

U.S. PATENT DOCUMENTS

| | | | | |
|---|---|---|---|---|
| 2002/0165703 A1* | 11/2002 | Olhofer | ............... | G06N 3/126 703/22 |
| 2015/0078664 A1* | 3/2015 | Epshtein | ............ | G06K 9/00463 382/176 |
| 2016/0171707 A1* | 6/2016 | Schwartz | .......... | G06K 9/00201 382/180 |
| 2016/0283564 A1* | 9/2016 | Sharon | ............. | G06F 17/30554 |

\* cited by examiner

*Primary Examiner* — Xiao Wu
*Assistant Examiner* — Mohammad H Akhavannik
(74) *Attorney, Agent, or Firm* — Shook, Hardy & Bacon, L.L.P.

(57) ABSTRACT

Embodiments of the present invention provide systems, methods, and computer storage media directed at decomposing a graphic design into constituent parts. In embodiments, a decomposition module is configured to partition pixels of a graphic design image into superpixels. This partitioning can be based on a color analysis of individual pixels of the graphic design image. Once partitioned into superpixels, the decomposition module may group the superpixels into components such that each component includes superpixels that are within a level of similarity from one another. The decomposition module can then categorize one or more of the components as textual elements of the graphic design based on text identification features of the components. Other embodiments may be described and/or claimed herein.

9 Claims, 7 Drawing Sheets

AUTOMATED DECOMPOSITION OF GRAPHIC DESIGNS

BACKGROUND

Graphic designs, such as posters, advertisements, cards, and websites are challenging for many novice graphic designers. Professional graphic designers may use sophisticated tools and years of education to produce informative and eye-catching designs. However, many graphic designs are still created by novices, and the results are frequently poor.

There are millions of professional graphic designs on the web that novice graphic designers can turn to for examples of informative and eye-catching designs; however, the composition of these graphic designs are often dependent on the amounts and/or types of content (e.g., textual content or visual content) incorporated therein. One problem is that most of these graphic designs exist as images, which makes it difficult to programmatically determine the amounts and/or types of content contained therein without the ability to decompose the images.

While there are various techniques that have been developed for decomposing natural images, these techniques face different challenges than those faced with respect to graphic designs. For example, techniques for detecting textual content in natural images need to be geared towards artifacts found in natural images, such as textures, affine transformations, and lighting variations that are not generally found in graphic designs. Graphic designs, on the other hand, present different artifacts than those found in natural images such as brush strokes and shapes that may cause visual content to be mistaken for textual content. As a result, the current natural image decomposition techniques are not useful in decomposing images of graphic designs.

The background description provided herein is for the purpose of generally presenting the context of the disclosure. Unless otherwise indicated herein, the materials described in this section are not prior art to the claims in this application and are not admitted to be prior art by inclusion in this section.

SUMMARY

Embodiments of the present invention are directed at systems, methods, and computer storage media to enable automated decomposition of graphic design images. In this regard, a graphic design image is decomposed into constituent parts, such as textual elements and/or graphical elements that is consistent with aspects generally included in these graphic design images, such as those discussed above. To accomplish this, pixels of the graphic design image can initially be partitioned into superpixels. As used herein, a superpixel refers to a group of one or more contiguous pixels. The partitioning can be based, for instance, on an analysis of the colors of the individual pixels of the graphic design. For example, contiguous pixels of a same or similar color may be grouped together into a superpixel.

Once the image has been partitioned into superpixels, the superpixels can be grouped into larger components based on a level of similarity between the superpixels. As a result, the components may be comprised of superpixels that are similar to one another. The decomposition module may then categorize each of the components as either text or non-text elements of the graphic design. In some embodiments, a decomposed graphic design that identifies the categorized components of the graphic design could be persisted in a database with other decomposed graphic designs.

Additional embodiments, of the present invention are directed at systems, methods, and computer-storage media to enable fulfillment of requests for suggested graphic designs by a graphic design engine. These requests may include, for example, textual and visual content that a user wishes to incorporate into the suggested graphic designs. The textual and visual content included in the request may be utilized to identify and return one or more suggested graphic designs from the previously mentioned database of decomposed graphic designs for selection of at least one of the one or more suggested graphic designs in which to incorporate the textual and visual content.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
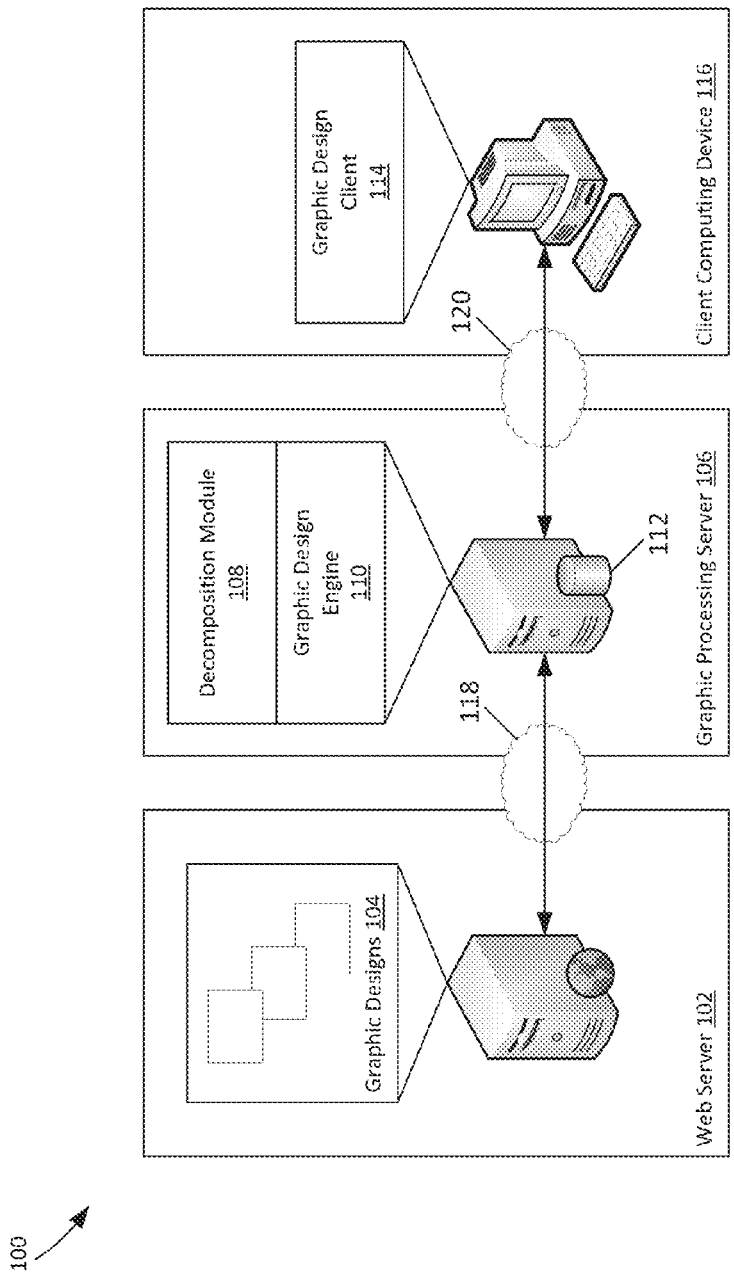
FIG. 1 depicts an illustrative computing environment in which various embodiments of the present disclosure may be employed.

There are millions of professional graphic designs on the web that novice graphic designers can turn to for examples of informative and eye-catching designs; however, the layouts of these graphic designs are often dependent on the amount and/or type of content contained therein. Because the layout of a graphic design is often dependent on the amount and/or type of content to be incorporated therein, a novice graphic designer would need to be able to identify professional graphic designs that match the amount and type of content that the novice graphic designer wishes to incorporate into their own graphic design. One problem with this is that most of these graphic designs exist as images, which makes it difficult to efficiently determine the amounts and/or types of content contained therein without the ability to decompose the images.

While there are various techniques that have been developed for decomposing natural images, these techniques face different challenges than those faced with respect to graphic designs. For example, techniques for detecting textual content in natural images need to be geared towards artifacts found in natural images, such as textures, affine transformations, and lighting variations that are not generally found in graphic designs. Graphic designs, on the other hand, present different artifacts than those found in natural images such as brush strokes and shapes that may cause visual content to be mistaken for textual content. As a result, the current natural image decomposition techniques are not useful in decomposing images of graphic designs.

Embodiments of the present invention are directed at enabling automated decomposition of graphic design images. In this regard, a graphic design image is decomposed into constituent parts, such as textual elements and/or graphical elements that are consistent with aspects generally included in these graphic design images, such as those discussed herein. These textual elements and visual elements may enable a novice graphic designer to more efficiently find graphic designs having an appropriate amount and/or type of content.

As mentioned above, in conventional natural image processing, texture plays an important role in analyzing natural images. Graphic designs, however, generally have less of a texture component than natural images. As a result, the graphic design can initially be partitioned into superpixels based on a color analysis of the pixels of the graphic design image. Such a color analysis, in some embodiments, may be accomplished without consideration of texture within the graphic design. Put another way, this color analysis may be accomplished independent of textures of the graphic design image. In other embodiments, texture analysis may be used in conjunction with this color analysis.

Once partitioned into superpixels, the superpixels can be grouped into components such that each component includes superpixels that are similar to one another. This can be based on a number of similarity features extracted from each of the superpixels. The decomposition module can then categorize the components into textual elements and visual elements based on a number of textual identification features.

Conventional text detection algorithms first classify individual characters and then group these individual characters as text. The above described embodiment, in contrast, first groups superpixels into components based on similarity, and then classifies each component as a textual element or a visual element based, at least in part, on textual identification features of the component as a whole. As a result, the processing of the individual components is reduced when compared with the amount of processing in detecting individual characters. This is because the classification in conventional text detection algorithms is performed on each individual character, whereas the above described process classifies groups of characters, thus reducing the number of classifications that would occur. In addition, the process described above enables classification of visual elements, in addition to the textual elements.

FIG. 1 depicts an illustrative computing environment 100 in accordance with various embodiments of the present invention. As depicted, computing environment 100 includes an example web server 102, an example graphic processing server 106, and an example client computing device 116. Each of these components can be coupled with one another via any combination of wired and/or wireless networks, represented here by networks 118 and 120.

In embodiments, web server 102 includes a number of graphic design images 104, hereinafter merely referred to as graphic designs 104 for simplicity. As used herein, a graphic design refers to any composition of textual and visual content assembled by an author to convey information to an audience. Composition refers to the placement or arrangement of the textual content and/or visual content. As used in this context, assembled by an author may refer to selection of individual pieces of textual content and/or visual content by the author that are then combined or arranged by the author in a manner to convey the information to the audience. Textual content refers to text-based content, in any language, contained within the graphic design, while visual content refers to any non-textual content (e.g., pictures, graphics, etc.) contained within the graphic design. Graphic design may also be referred to in the art as visual communication or communication design. Graphic designs may generally take the form of posters, advertisements, cards, logos, pamphlets, websites, and the like. Graphic designs 104 include digitally generated graphic designs as well as digital representations of physical graphic designs (e.g., scans). Such a digital graphic design, or digital representation, may take any form, such as, a vector representation (e.g., portable document format (PDF), scalable vector graphics (SVG), encapsulated postscript format (EPS)); an image representation (e.g., Joint Photographic Experts Group (JPEG) format, bitmap (BMP) format, portable network graphic (PNG) format, etc.); or the like.

Graphic designs 104 may be stored digitally as an array of pixels that compose the respective graphic designs. Each of these pixels would be assigned certain information, such as, for instance, color information. For example, in some embodiments, each pixel is assigned a value in the red, green, blue (RGB) color domain. The RGB color domain, also referred to in the art as the RGB color model, is an additive representation of a color. In the RGB color domain, each pixel would be assigned a color by assigning an amount of red, green, and blue to each pixel, hereinafter referred to as an RGB color value. The combination of this RGB color value would represent the color of the pixel. It will be appreciated that the RGB color domain is merely meant to be an example of a possible color domain and that the teachings of this disclosure could be applied to any color domain, or representation of color, without departing from the scope of this disclosure. Additionally, or alternatively, graphic design could also contain alpha values, or multiple layers or could be represented by a number of pixels or with vector graphics.

Graphic processing server 106 includes decomposition module 108, graphic design engine 110, and a database of decomposed graphic designs 112, hereinafter merely referred to as database 112. In embodiments, decomposition module 108 is configured to receive graphic designs 104 from webserver 102. Graphic designs 104 could be received by decomposition module 108 via network 118 over any suitable protocol, such as hypertext terminal protocol (HTTP), file transfer protocol (FTP), or the like. Graphic designs 104 may, in some embodiments, be received by decomposition module 108 in response to a pull request initiated by decomposition module 108. In other embodiments, web server 102 may have an agent installed that is configured to push graphic designs 104 to decomposition module 108. Graphic design can be received from a predefined dataset, or be provided by the user.

In embodiments, decomposition module 108 is configured to partition the pixels of the graphic design into superpixels based on an analysis of the above discussed color information. As mentioned above, a superpixel refers to a group of one or more contiguous pixels. The partitioning of the pixels into superpixels may be accomplished, for example, utilizing a k-means analysis of the color information assigned to each pixel of the graphic design. K-means analysis may also be referred to in the art as k-means clustering. A k-means analysis partitions n observations into k clusters in which each of the n observations belongs to the cluster with the nearest mean to that observation. Here, the n observations would be the number of pixels within the image and the k clusters would be the number of superpixels that the image is partitioned into. Each of the k clusters then get partitioned into groups of contiguous pixels according to spatial proximity. An example k-means analysis is depicted in image 304 of FIG. 3A. K-means analysis is generally known in the art and, as a result, will not be discussed in greater detail.

In partitioning the pixels of the graphic design into superpixels, there is a possibility that a large number of superpixels may be generated having only one or a few pixels contained therein. For example, an edge or border between two components of the graphic design may have a number of isolated pixels that each belong to a different superpixel. Such a granularity may increase the amount of subsequent processing that decomposition module 108 needs to carry out. In order to control the granularity of the superpixels resulting from the above described color analysis, in some embodiments, a threshold minimum size for a superpixel may be defined. In such an embodiment, any superpixel below this threshold size would be considered a minor superpixel. Decomposition module 108 may be configured to identify these minor superpixels as part of the partitioning process and may incorporate the minor superpixels, or any subset of pixels contained therein, into one or more neighboring superpixels respectively adjacent to each of the minor superpixels. As such, these minor superpixels would essentially be absorbed into neighboring superpixels and thus reduce the granularity of the partitioning. As an example, in some embodiments, only singular isolated pixels may be of concern. In such embodiments, the threshold minimum size could be set to two pixels. As such, only those superpixels composed of a single pixel would be identified as minor superpixels and subject to incorporation with neighboring superpixels.

In some embodiments, decomposition module 108 may be configured to perform a fuzzy partitioning process on boundary pixels between two components of the graphic design. In such a fuzzy partitioning process, decomposition module 108 may identify a boundary pixel that is included in both a first and second superpixel of the plurality of superpixels. Decomposition module 108 may then calculate a first probability that the boundary pixel belongs to the first superpixel and a second probability that the boundary pixel belongs to the second superpixel. In some embodiments, the first probability and the second probability may sum to 1. Decomposition module 108 may then assign the boundary pixel to either the first or second superpixel based on the first and second probability. For example, a boundary pixel that is within 80% of the color of a first neighboring superpixel and 20% of the color of a second neighboring superpixel would be incorporated into the first neighboring superpixel. This may be beneficial in cases where an anti-aliasing process has been carried out on the graphic design being processed.

Once the graphic design has been partitioned into superpixels as described above, decomposition module 108 may be configured to group the resulting superpixels into components based on a level of similarity between the resulting superpixels. This grouping would thus result in components that are comprised of superpixels that are similar to one another, or within a level of similarity from one another. This level of similarity may be defined, in some embodiments, as a threshold of similarity wherein those superpixels that are above the threshold of similarity are grouped together and those that fall below the threshold of similarity are not, either of which may be inclusive of the threshold (e.g., greater than or equal to).

To determine a level of similarity between a first superpixel and a second superpixel, the decomposition module may be configured to analyze one or more similarity features of the superpixels. These similarity features may include any measurable feature of a superpixel. For example, the level of similarity between the first superpixel and the second superpixel may be determined from an analysis of stroke similarity between the first and second superpixels, color similarity between the first and second superpixels, distance between the first and second superpixels, respective area measurements of the first and second superpixels, similarity in x and/or y coordinate positioning of the first and second superpixels, whether one superpixel is surrounded by the other superpixel, whether the first and second superpixels are surrounded by a third superpixel, alignment of the first and second superpixels, contrast of the first superpixel and the second superpixel with a background of the graphic design, similarity of the orientation of the first superpixel and the second superpixel within the graphic design, or any combination thereof.

In some embodiments, decomposition module 108 may be configured to analyze any combination of the above mentioned similarity features to determine superpixels that belong to the same components. This may be accomplished, for example, using graph theory to determine connected components within the graphic design. In such a graph theory implementation, decomposition module 108 could define each superpixel as a separate node of a graph. If a level of similarity between two superpixels is above the threshold, based on the above mentioned similarity features, then the two superpixels are considered to be within the level of similarity of one another and a connection can be made between the two superpixels on the graph, regardless of whether the two superpixels are contiguous. Once all superpixels have been processed, each group of superpixels that are connected within the graph would identify a single component of the graphic design. As such, in this context, a connected component would refer to the level of similarity that connects the superpixels of the component rather than actual contiguous connection between the superpixels of the component within the graphic design. For instance, a connected component in this context may include two or more sub-components, that are noncontiguous, or do not touch in the graphic design, but nevertheless are within the level of similarity from one another and therefore connected according to the graph. This level of similarity may be a threshold, such as that mentioned above, that is either predefined or programmatically defined by decomposition module 108.

Once the superpixels of the graphic design have been grouped into components, decomposition module 108 may be configured to analyze and categorize each component by type of element, such as a textual or visual (e.g., non-textual) element of the graphic design. Such an analysis may be based on text identification features extracted from each of the above discussed components of the graphic design. These text identification features may include stroke width consistency within each component; average stroke width within each component; length of brush stroke within each component; orientation of text within each component; orientation consistency of each component; contrast of each component with respect to a background of the graphic design; foreground color consistency within each component; background color consistency within each component; consistency of character sizes within each component; depth of each component in the graphic design (e.g., number of components that surround the respective component under consideration); aspect ratio of each component; or any combination of these text identification features.

From the above mentioned text identification features, a number of rules may be established to identify different types of text within the graphic design. Each of these rules would consist of a product of binary criteria applied to a selected group of the text identification features, up to and including all of the text identification features mentioned above. Each criteria may be defined as a threshold and the criteria may be satisfied by a respective text identification feature of a component being either above or below the threshold. It will be appreciated that being above or below the threshold could be inclusive of the threshold (e.g., greater than or equal to) or exclusive of the threshold (e.g., greater than). These rules may include specific rules for small text, large text, low contrast text, oriented text, and/or connected text to enable identification of all textual elements of the graphic design. As used herein, small text would include text that is below a predefined threshold of size. Small text could be text that is visible but may be difficult to read (e.g., fine print). Large text would include text that is above a predefined threshold of size. This may be the same predefined threshold of size utilized to for small text or may be a different predefined threshold of size. Large text may, for instance, span the width of the graphic design (e.g., a title). Low contrast text would include text that is below a predefined level of contrast with a background color. Oriented text would include text that has a non-horizontal component to the text. For example, text that runs vertically on a graphic design would be oriented text. Connected text would include text where individual characters are connected. For example, connected text would include calligraphy text. In some embodiments, the text identification criteria may be selected such that at least a subset of the textual elements represent individual lines of text from the graphic design.

The individual rules for the above discussed types of text could be weighted to promote or suppress different rules. In order to optimize the relative weights of different rules, several examples are used together with ground truth labels. Relative weights can be adjusted using a regressor or classifier including utilizing a support vector machine (SVM). In addition, the criteria for each rule, discussed above, may be adjusted, or fine-tuned, utilizing covariance matrix adaptation (CMA).

Once the textual elements of the graphic design have been identified, decomposition module 108 may be configured, in some embodiments, to define a text segmentation. Such a text segmentation would identify the individual pixels of each of the textual elements. This would be in contrast to merely defining a bounding box with a perimeter that surrounds each individual textual element. A segmentation is more precise than a bounding box because a bounding box would necessarily be over inclusive in that a bounding box would, for instance, include space between letters and above or below letters (e.g., lines of text that include descending letters such as 'j' or 'g').

The segmentation may be defined in any manner that identifies the individual pixels of the textual elements. For instance, in some embodiments, the segmentation of a textual element may include a list of identifiers for each pixel of the textual element. This list of identifiers could be, for example, (x,y) coordinates of each individual pixel within the graphic design. In other embodiments, a unique identifier for the textual element may be added to metadata associated with each pixel of the textual element. For example, the textual element could be assigned a unique alpha-numeric identifier that is then incorporated in the metadata of each pixel of the textual element. It will be appreciated that these are merely meant to be examples of possible ways individual pixels of the text elements are defined. Other mechanisms of identifying the individual pixels may be utilized without departing from the scope of this disclosure.

Regardless of the manner in which the segmentation is defined, in some embodiments, decomposition module 108 may be configured to remove the individual pixels identified by the text segmentation from the graphic design. This may be accomplished, for instance, by merely deleting the data (e.g., color information) associated with the pixels identified in the text segmentation. Once the individual pixels of the text segmentation have been removed, decomposition module 108 may be configured to fill in, or substitute, the removed pixels with replacement pixels. Such replacement pixels may be set to mimic aspects (e.g., color) of respective reference pixels of the graphic design. A reference pixel may be selected, for example, using a distance transform technique. In such a distance transform technique, the reference pixel would be a pixel of the graphic design that is closest in proximity to the pixel that was removed.

Once the text elements have been removed, decomposition module 108 may be configured to process the visual elements of the graphic design. In some embodiments, the processing of the visual elements of the graphic design may begin by regrouping the visual elements based on graphics-specific grouping criteria applied to the similarity features discussed above. In such embodiments, the grouping criteria may be selected to generate larger components. In addition, the graphics-specific grouping criteria may put more weight on proximity within the image and less weight on color consistency. The graphics-specific grouping criteria may also be selected to form groups with topologically fewer holes.

Regardless of whether the visual elements of the graphic design are regrouped, decomposition module 108 may be configured to evaluate the remaining components and/or visual elements to determine whether the components and/or visual elements are properly categorized as visual elements of the graphic design. Such a determination may be based on, for example, whether the individual element is larger than a predefined threshold minimum size for visual elements. For example, if a component only comprises one superpixel the component may not be large enough to be categorized as a visual element. In addition, such a determination may be additionally based on whether the visual element comprises a background of the graphic design.

Once decomposed into textual elements and visual elements, the decomposed graphic design may be persisted in database 112 with a number of other decomposed graphic designs. In embodiments, the decomposed graphic design may be persisted in database 112 as the original graphic design along with metadata identifying the text segmentation and the graphical segmentation of the graphic design. In other embodiments, the decomposed graphic design may be persisted in database 112 as component pieces (e.g., text segmentations, graphic segmentations, and background) along with metadata that identifies locations for the component pieces within the graphic design, such that the graphic design could be reassembled from the component pieces using the metadata. It will be appreciated that these embodiments are meant to be illustrative of possible embodiments and should not be treated as limiting of this disclosure. Other methods of persisting the decomposed graphic designs may be implemented without departing from the scope of this disclosure.

As mentioned above, graphic processing server 106 may also include a graphic design engine 110. Graphic design engine 110 can generally be configured to receive a request for suggestion of one or more graphic designs. Such a request may originate from graphic design client 114 of client computing device 116 and may be received via network connection 120. In some embodiments, the request may include textual and/or visual content that a user of client computing device 116 would like to incorporate into a graphic design.

In response to receiving the request, graphic design engine 110 may be configured to analyze the decomposed graphic designs in database 112 to identify one or more graphic designs that include textual and/or visual elements that are similar to the textual and/or visual content submitted with the request. In some embodiments, this similarity may be based solely on the quantity of the textual and/or visual content. In other embodiments, this similarity may be based on any number of other factors in addition to, or in place of, the quantity of the content, including, for example, color, desired text size of textual content, desired size of visual content, etc.

Figure 5:
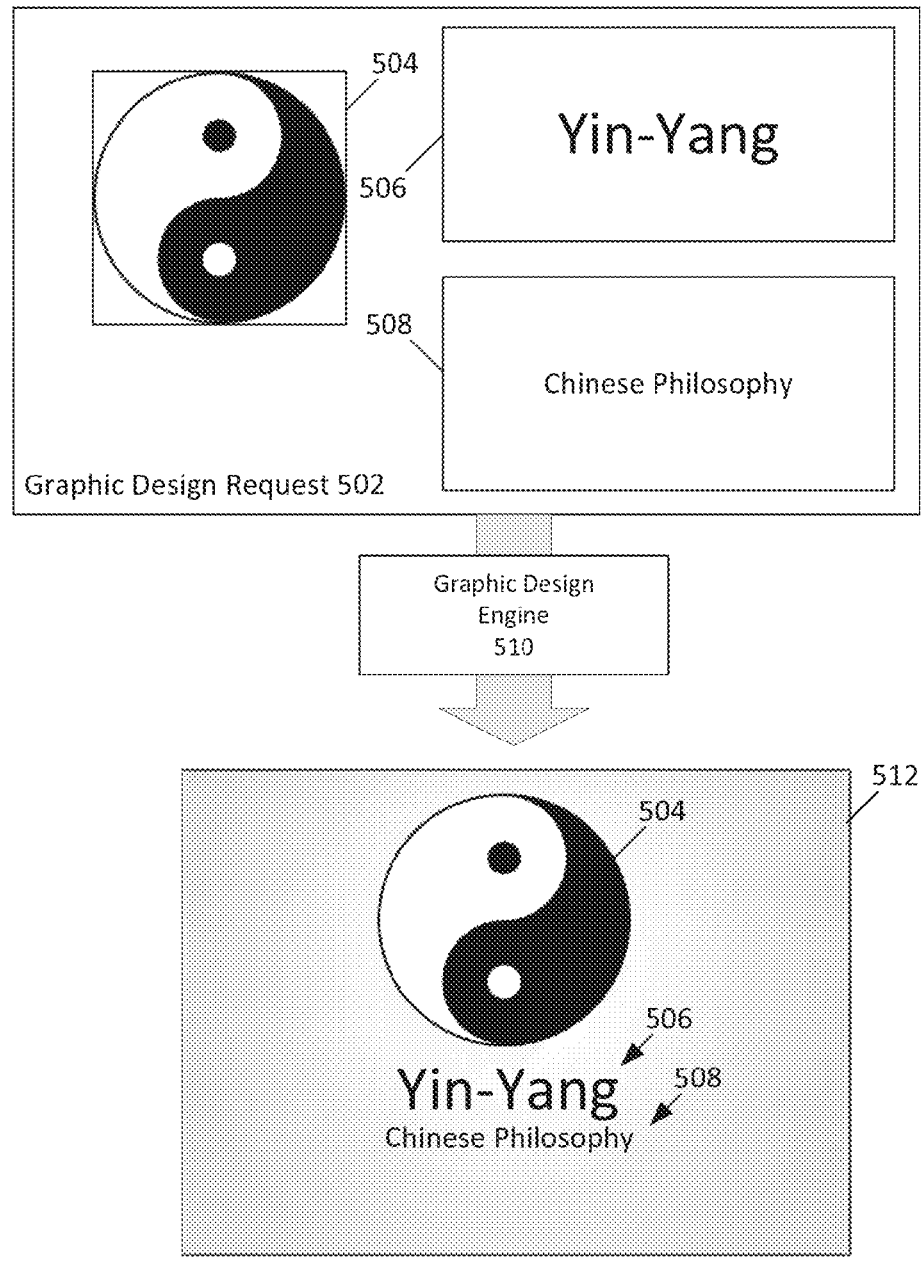
FIG. 5 depicts an example graphic design request and a result thereof in accordance with various embodiments of the present disclosure.

Once identified, the one or more graphic designs may be returned to graphic design client 114 as one or more suggested graphic designs for selection of at least one of the one or more suggested graphic designs in which to incorporate the textual and visual content. In some embodiments, graphic design client 114 and/or graphic design engine 110 may be configured to automatically incorporate the textual and visual content into the selected graphic design, as depicted in FIG. 5.

While depicted as separate entities of graphic processing server 106 for ease of description, it will be appreciated that, in some embodiments, decomposition module 108 and graphic design engine 110 may be integrated with one another into a single component. In other embodiments, decomposition module 108 and/or graphic design engine 110 may be further divided into smaller functional units. All of these embodiments are expressly within the scope of this disclosure.

While depicted singularly for ease of description, it will be appreciated that each of the components depicted in system 100 may be one of many components. For example, web server 102 may be one of many sources of graphic designs. Other sources may include other web servers, graphic design databases, or any other source of graphic designs. In addition, graphic processing server 106 may be one of many similarly configured graphic processing servers. Each of these similarly configured graphic processing servers may have its own database of decomposed graphic designs, or may share a database or databases of decomposed graphic designs. As used herein, a similarly configured graphic processing server may include a decomposition module 108 and/or a graphic design engine 110, as described above. Furthermore, client computing device 116 may be one of many client computing devices configured with a graphic design client 114. As a result, this disclosure is not to be limited by the quantity or specific makeup of the individual components depicted in FIG. 1. Any number of components is expressly contemplated.

Figure 2:
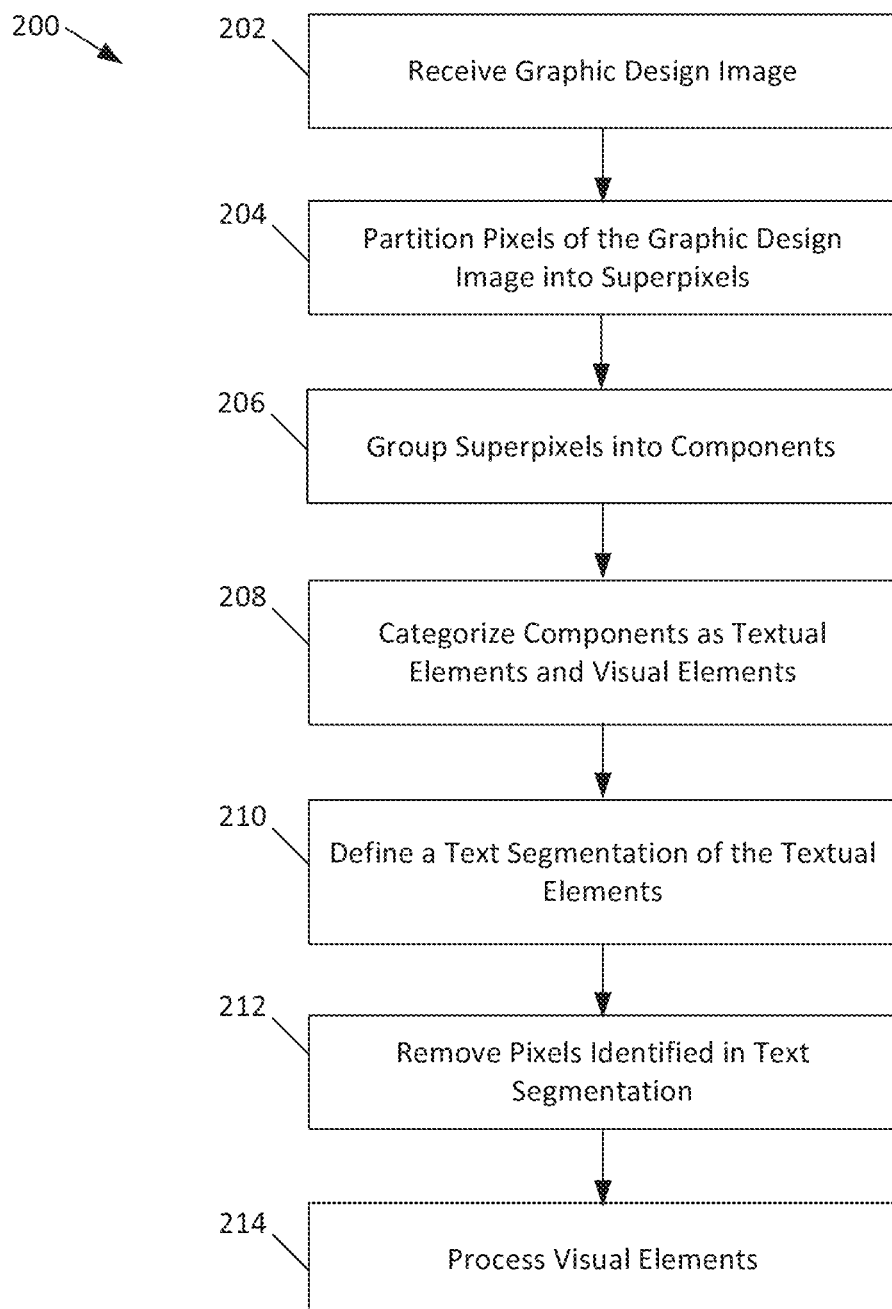
FIG. 2 is an illustrative process flow diagram showing a method for automatically decomposing a graphic design in accordance with various embodiments of the present disclosure.
Figure 3A:
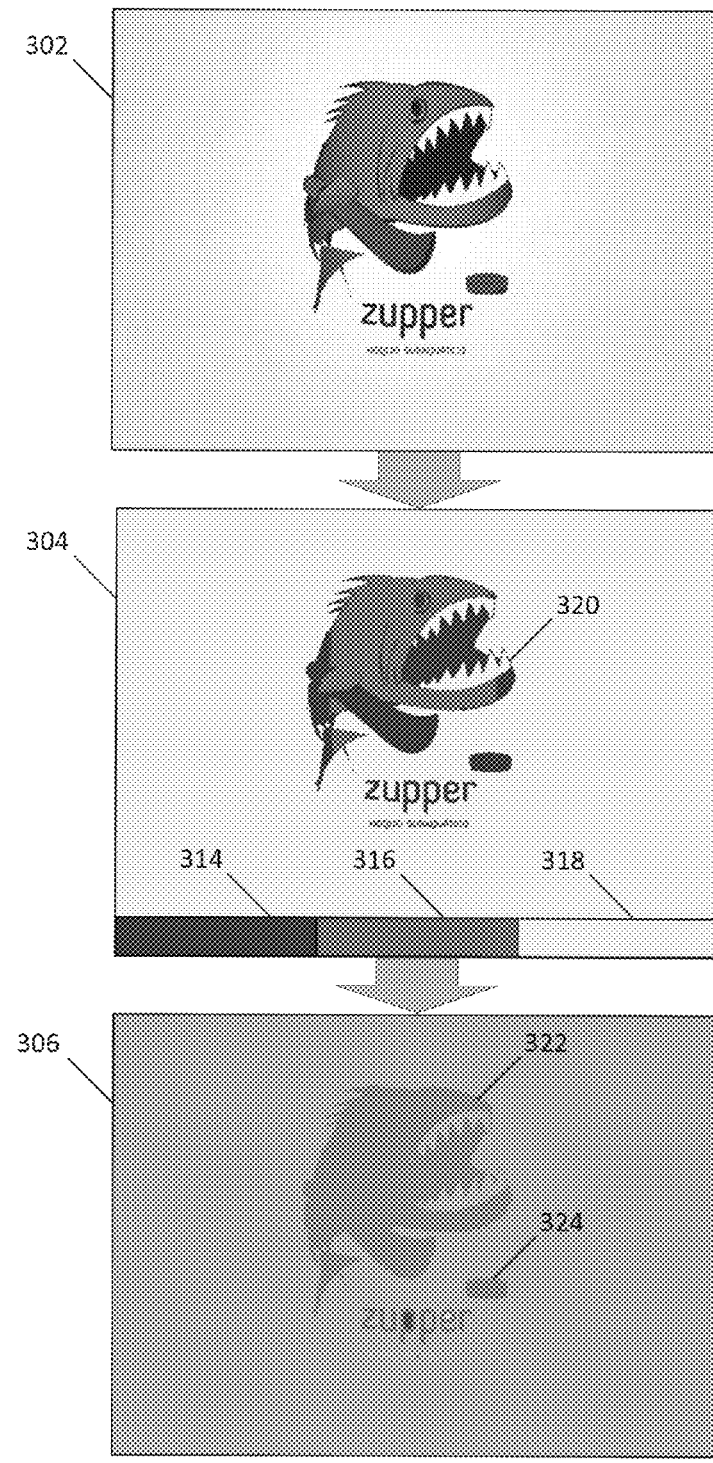
FIGS. 3A-B depicts selected operations of an illustrative decomposition of a graphic design, in accordance with various embodiments of the present disclosure.
Figure 3B:
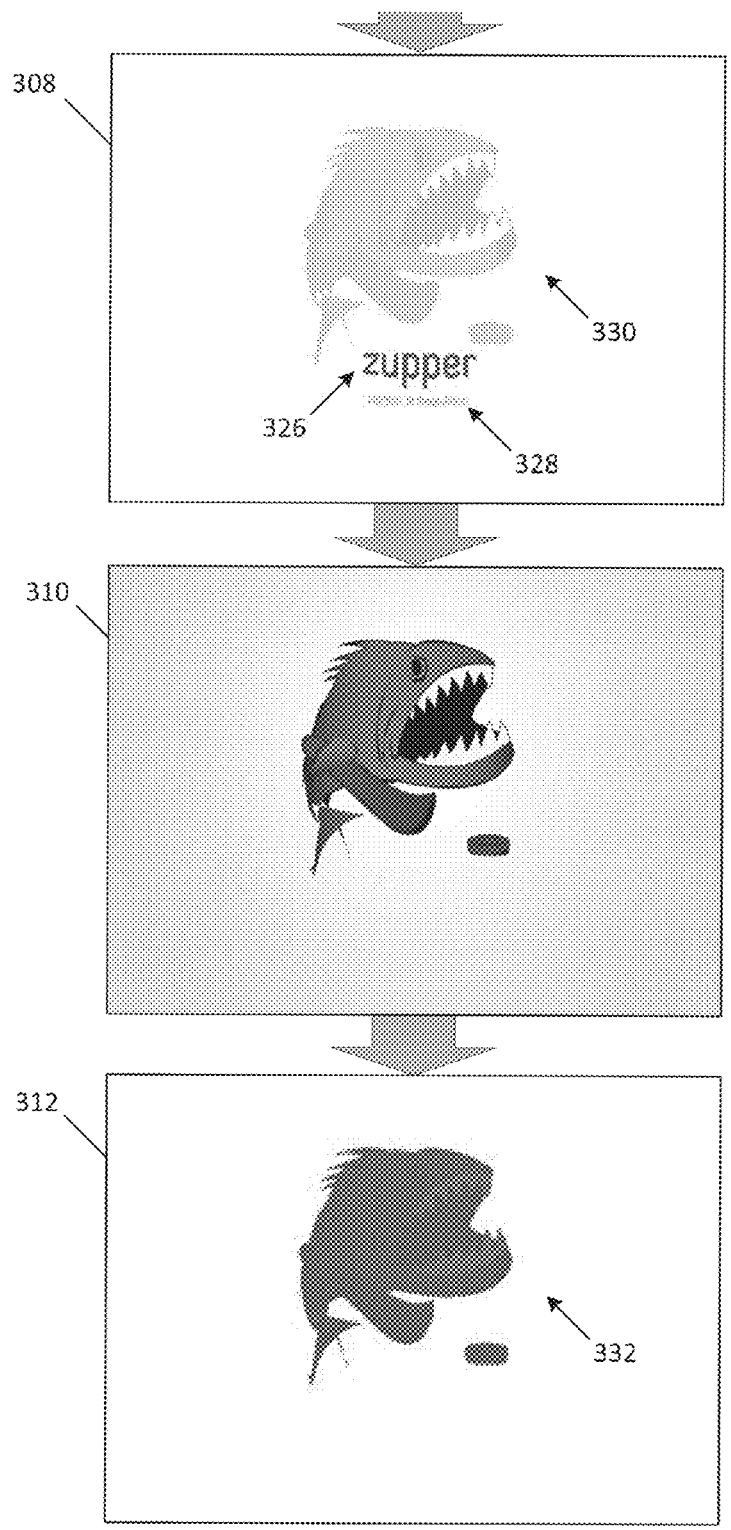

FIG. 2 depicts an illustrative a process flow diagram 200 showing a method for automatically decomposing a graphic design image in accordance with various embodiments of the present disclosure. FIGS. 3A-B depict selected operations of process flow 200, in accordance with various embodiments of the present disclosure. As a result, FIG. 2 and FIGS. 3A-B will be described in conjunction with one another. Process flow 200 begins at block 202 where an image of a graphic design is received. Such an image of a graphic design is depicted by graphic design image 302. The graphic design image could be received via any wired or wireless network over any suitable protocol, such as hypertext terminal protocol (HTTP), file transfer protocol (FTP), or the like. The graphic design image may be represented digitally by a number of pixels that compose the graphic design image. Each of these pixels would be assigned certain information, such as, for instance, color information, such as that discussed above in reference to FIG. 1.

At block 204 the pixels of the graphic design image are partitioned into superpixels based on an analysis of the above discussed color information. The partitioning of the pixels into superpixels may be accomplished, for example, utilizing a k-means analysis of the color information assigned to each pixel of the graphic design image. K-means analysis may also be referred to in the art as a k-means clustering. A k-means analysis partitions n observations into k clusters in which each of the n observations belongs to the cluster with the nearest mean to that observation. Here, the n observations would be the number of colors contained within the image and the k clusters would be the number of superpixels that the image is partitioned into. Such a k-means analysis is depicted in image 304. As depicted in image 304, the graphic design image includes three observations 314-318, or colors (depicted here in grayscale).

In partitioning the pixels of the graphic design image into superpixels, there is a possibility that a large number of superpixels may be generated having only one or a few pixels contained therein. For example, an edge or border between two components of the graphic design image (e.g., border 320) may have a number of isolated pixels that each belong to a different superpixel. Such a granularity may increase the amount of processing that decomposition module 108 needs to carry out. In order to control the granularity of the superpixels resulting from the above described color analysis, in some embodiments, a threshold minimum size for a superpixel may be defined. In such an embodiment, any superpixel below this threshold size would be considered a minor superpixel. Decomposition module 108 may be configured to identify these minor superpixels as part of the partitioning process and may incorporate the minor superpixels, or any subset of pixels contained therein, into one or more neighboring superpixels respectively adjacent to each of the minor superpixels. As such, these minor superpixels would essentially be absorbed into neighboring superpixels and thus reduce the granularity of the partitioning.

In some embodiments, a fuzzy partitioning process could be performed on boundary pixels between two components of the graphic design image. In such a fuzzy partitioning process, a boundary pixel that is included in both a first and second superpixel would be identified. Once the boundary pixel is identified, a first probability that the boundary pixel belongs to the first superpixel and a second probability that the boundary pixel belongs to the second superpixel would be calculated. In some embodiments, the first probability and the second probability sum to 1. The boundary pixel may then be assigned to either the first or second superpixel based on the first and second probability. For example, a boundary pixel that is within 80% of the color of a first neighboring superpixel and 20% of the color of a second neighboring superpixel, would be incorporated into the first neighboring superpixel. This may be beneficial in cases where an anti-aliasing process has been carried out on the graphic design image being processed.

Once the graphic design image has been partitioned into superpixels as described above, the resulting superpixels may be grouped into components at block 206. Such a grouping is depicted in image 306. This grouping may be based on a level of similarity between the resulting superpixels and would thus result in components that are comprised of superpixels that are similar to one another, or within a level of similarity from one another. This level of similarity may be defined, in some embodiments, as a threshold of similarity wherein those superpixels that are above the threshold of similarity are grouped together and those that fall below the threshold of similarity are not, either of which may be inclusive of the threshold (e.g., greater than or equal to).

A level of similarity between a first superpixel and a second superpixel may be determined based on one or more similarity features of the superpixels. These similarity features may include any measurable feature of a superpixel. For example, the level of similarity between the first superpixel and the second superpixel may be determined from an analysis of stroke similarity between the first and second superpixels, color similarity between the first and second superpixels, distance between the first and second superpixels, respective area measurements of the first and second superpixels, similarity in x and/or y coordinate positioning of the first and second superpixels, whether one superpixel is surrounded by the other superpixel, whether the first and second superpixels are surrounded by a third superpixel, alignment of the first and second superpixels, contrast of the first superpixel and the second superpixel with a background of the graphic design image, similarity of the orientation of the first superpixel and the second superpixel within the graphic design image, or any combination thereof.

Any combination of the above mentioned similarity features may be analyzed to determine superpixels that belong to the same components. This may be accomplished, for example, using graph theory to determine connected components within the graphic design image. A connected component would be made up of superpixels that are connected within the graph. As used in this context, a connected component refers to the level of similarity that connects the superpixels of the component rather than actual contiguous connection between the superpixels of the component within the graphic design image. For instance, a connected component in this context may include two or more subcomponents, that are noncontiguous, or do not touch in the graphic design image, but nevertheless are within a level of similarity from one another and therefore connected according to the graph. An example of such a noncontiguous component is depicted by subcomponents 322 and 324. This level of similarity may be a threshold, such as that mentioned above, that is either predefined or programmatically defined. In implementing such a graph theory implementation, each superpixel may be defined as a separate node of the graph. If the level of similarity between two superpixels is above the threshold, based on the above mentioned similarity features, then the two superpixels are considered to be within the level of similarity of one another and a connection may be made between the two superpixels on the graph. Once all superpixels have been processed, each group of superpixels that are connected within the graph would identify a single component of the graphic design image.

Once the superpixels of the graphic design image have been grouped into components, each component may be categorized as a textual or visual (e.g., non-textual) element (e.g., textual elements 326 and 328; and visual element 330 of image 308) of the graphic design image at block 208. Such an analysis may be based on text identification features extracted from each of the above discussed components of the graphic design image. These text identification features may include stroke width consistency within each component; average stroke width within each component; length of brush stroke within each component; orientation of text within each component; orientation consistency of each component; contrast of each component with respect to a background of the graphic design image; foreground color consistency within each component; background color consistency within each component; consistency of character sizes within each component; depth of each component in the graphic design image (e.g., number of components that surround the respective component under consideration); aspect ratio of each component; or any combination these text identification features.

From the above mentioned text identification features, a number of rules may be established to identify different types of text within the graphic design image. Each of these rules would consist of a product of binary criteria applied to a selected group of the text identification features, up to and including all of the text identification features mentioned above. Each criteria may be defined as a threshold and the criteria may be satisfied by a respective text identification feature of a component being either above or below the threshold. It will be appreciated that being above or below the threshold could be inclusive of the threshold (e.g., greater than or equal to) or exclusive of the threshold (e.g., greater than). These rules may include specific rules for small text, large text, low contrast text, oriented text, and/or connected text. As used herein, small text would include text that is below a predefined threshold of size. Small text could be text that is visible but may be difficult to read (e.g., fine print 328). Large text would include text that is above a predefined threshold of size. This may be the same predefined threshold of size utilized to for small text or may be a different predefined threshold of size. For instance, large text may span the width of the graphic design image (e.g., a title). Low contrast text would include text that is below a predefined level of contrast with a background color. Oriented text would include text that has a non-horizontal component to the text. For example, text that runs vertically on a graphic design image would be oriented text. Connected text would include text where individual characters are connected. For example, connected text would include calligraphy text. In some embodiments, the text identification criteria may be selected such that at least a subset of the textual elements represent individual lines of text from the graphic design image.

The individual rules for the above discussed types of text could be weighted to promote or suppress different rules. In order to optimize the relative weights of different rules, several examples are used together with ground truth labels. Relative weights can be adjusted using a regressor or classifier including utilizing a support vector machine (SVM). In addition, the criteria for each rule, discussed above, may be adjusted, or fine-tuned, utilizing covariance matrix adaptation (CMA).

Once the textual elements of the graphic design image have been identified, a text segmentation may be defined at block 210. Such a text segmentation would identify the individual pixels of each of the textual elements. This would be in contrast to merely defining a bounding box with a perimeter that surrounds each individual textual element. As previously mentioned, a segmentation is more precise than a bounding box because a bounding box would necessarily be over inclusive in that a bounding box would, for instance, include space between letters and above or below letters (e.g., lines of text that include descending letters such as 'j' or 'g').

The segmentation may be defined in any manner that identifies the individual pixels of the textual elements (e.g., textual elements 326 and 328). For instance, in some embodiments, the segmentation of a textual element may include a list of identifiers for each pixel of the textual element. This list of identifiers could be, for example, (x,y) coordinates of each individual pixel within the graphic design image. In other embodiments, a unique identifier for the textual element may be added to metadata associated with each pixel of the textual element. For example, the textual element could be assigned a unique alpha-numeric identifier that is then incorporated in the metadata of each pixel of the textual element.

Regardless of the manner in which the text segmentation is defined, in some embodiments, the individual pixels identified by the text segmentation may be removed from the graphic design image at block 212 and as depicted in image 310. This may be accomplished, for instance, by merely deleting the data (e.g., color information) associated with the pixels identified in the text segmentation. Once the individual pixels of the text segmentation have been removed, the removed pixels may be filled in, or substituted, with replacement pixels. Such replacement pixels may be set to mimic aspects (e.g., color) of respective reference pixels of the graphic design image. A reference pixel may be selected, for example, using a distance transform technique. In such a distance transform technique, the reference pixel would be a pixel of the graphic design image that is closest in proximity to the pixel that was removed.

Once the text elements have been removed, the visual elements of the graphic design image are processed at block 214. In some embodiments, the processing of the visual elements of the graphic design image may begin by regrouping the visual elements 332 based on graphics-specific criteria applied to the similarity features discussed above. In such embodiments, the grouping criteria may be selected to generate larger components. In addition, the graphics-specific grouping criteria may put more weight on proximity and less weight on color consistency. The graphics-specific grouping criteria may also be selected to form groups with topologically fewer holes.

Regardless of whether the visual elements of the graphic design image are regrouped, the remaining components and/or visual elements may be analyzed to determine whether the components and/or visual elements are properly categorized as visual elements of the graphic design image. Such a determination may be based on whether the individual element is larger than a threshold minimum size for visual elements. For example, if a component only comprises one superpixel the component may not be large enough to be categorized as a visual element. In addition, such a determination may be additionally based on whether the visual element comprises a background of the graphic design image. Once it is determined that the components/visual elements are properly categorized as visual elements, the graphic segmentation of the graphic elements may be defined. The graphic segmentation identifies individual pixels of each of the visual elements in a similar manner to that discussed above in reference to the textual elements. Once decomposed into textual elements and visual elements, the decomposed graphic design may be persisted in a database of decomposed graphic designs with a number of other decomposed graphic designs.

Figure 4:
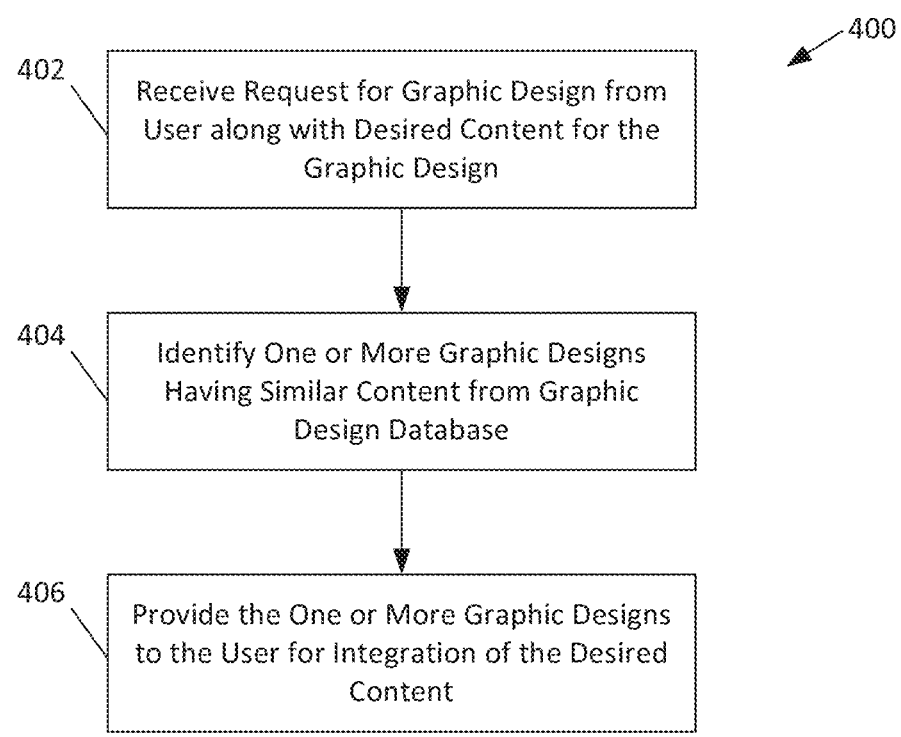
FIG. 4 is an illustrative process flow diagram showing a method for servicing a graphic design request in accordance with various embodiments of the present disclosure.

FIG. 4 is a process flow diagram 400 showing a method for servicing a graphic design request in accordance with various embodiments of the present disclosure. FIG. 5 depicts an example graphic design request 502 and a result thereof 512 in accordance with various embodiments of the present disclosure. As a result of the related nature of these figures, FIGS. 4 and 5 will be described in conjunction with one another. Process flow 400 may be carried out by graphic design engine 110 of FIG. 1 or 510 of FIG. 5.

Process flow 400 begins at block 402 where a request (e.g., graphic design request 502) may be received for one or more suggested graphic designs. In some embodiments, the request may include textual content (e.g., textual content 506 and 508) and/or visual content (e.g., visual content 504) that a user would like to incorporate into a graphic design.

In response to receiving the request, at block 404 one or more suggested graphic designs may be identified from a graphic design database (e.g., database 112 of FIG. 1). These one or more suggested graphic designs may be identified based on a measure of similarity between the textual and/or visual elements of the graphic designs and the textual and/or visual content submitted with the request. In some embodiments, this may be based solely on the quantity of the textual and/or visual content. In other embodiments, this similarity may be based on any number of other factors in addition to, or in place of, the quantity of the content, including, for example, color, desired text size of textual content, desired size of visual content, etc.

Once identified, the one or more graphic designs may be provided to the user at block 406 as suggested graphic designs for selection of one of the one or more of the suggested graphic designs in which to incorporate the textual and visual content. In some embodiments, graphic design engine 510 may automatically incorporate the textual content 506 and 508 and visual content 504 of graphic design request 502 into the graphic design. Such an incorporation is depicted by result 512 in which the textual and visual content has been incorporated into a graphical design similar to the graphic design depicted in FIGS. 3A and 3B.

Figure 6:
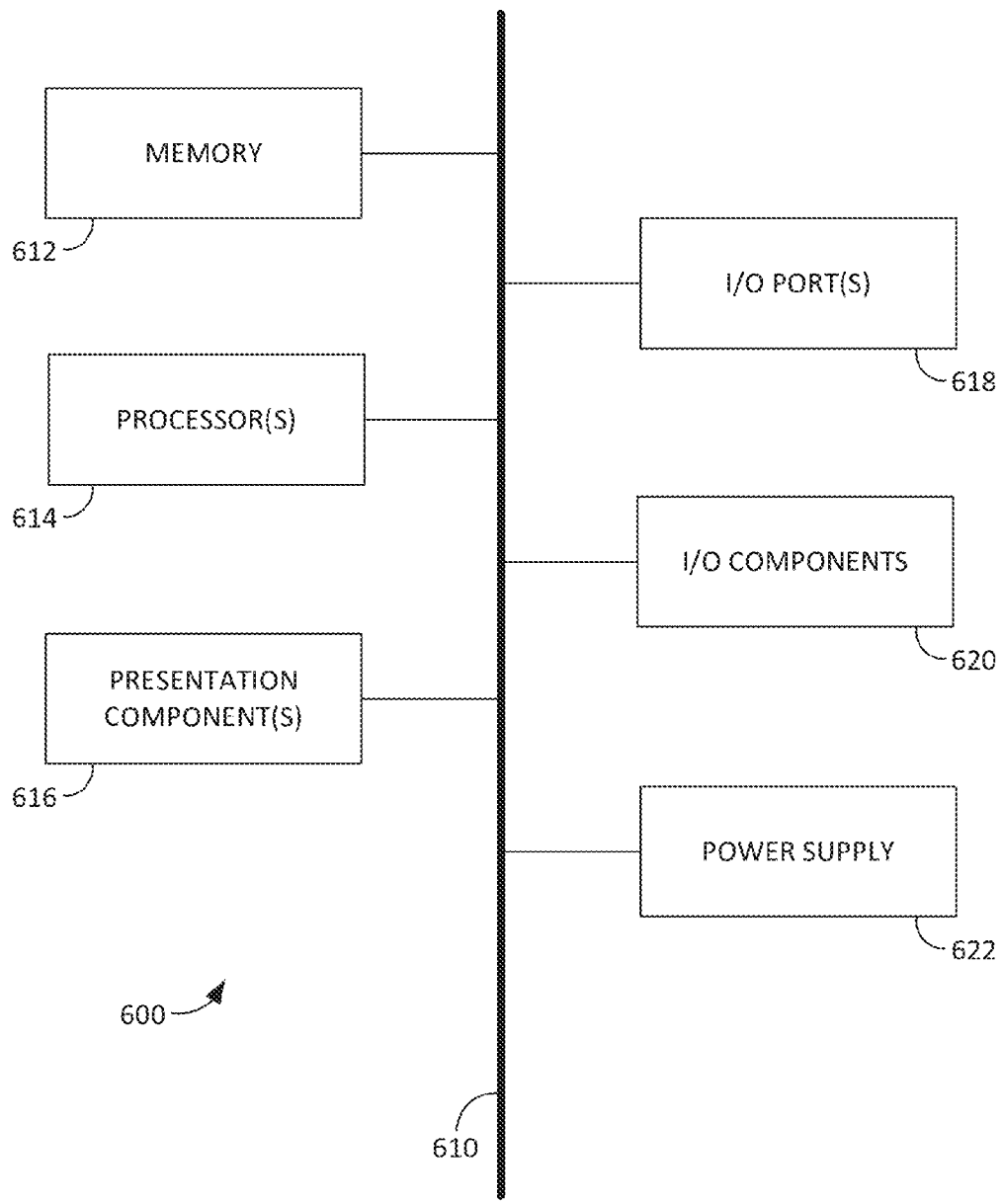
FIG. 6 is a block diagram of an example computing device in which various embodiments of the present disclosure may be employed.

Having described embodiments of the present invention, an example operating environment in which embodiments of the present invention may be implemented is described below in order to provide a general context for various aspects of the present invention. Referring to FIG. 6, an illustrative operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or combination thereof). Although depicted in FIG. 6, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 616 while also being one of the I/O components 620. As another example, processors have memory integrated therewith in the form of cache; however, there is no overlap between the one or more processors 614 and the memory 612. A person having of skill in the art will readily recognize that such is the nature of the art, and it is reiterated that the diagram of FIG. 6 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 600 of FIG. 6 and any other reference to "computing device," unless the context clearly indicates otherwise.

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 600 includes one or more processors 614 that read data from various entities such as memory 612 or I/O components 620. Presentation component(s) 616 present data indications to a user or other device. Illustrative presentation components include a display device, speaker, printing component, vibrating component, etc.

I/O ports 618 allow computing device 600 to be logically coupled to other devices including I/O components 620, some of which may be built in. Illustrative components include a stylus, such as that discussed elsewhere herein, a drawing tablet, such as that discussed elsewhere herein, a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to one or software modules or applications that may cause the display of the computing device 600 to render immersive augmented reality or virtual reality.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. A computing device for decomposition of graphic designs into constituent parts comprising:
   one or more processors;
   a decomposition module coupled with the one or more processors, wherein operation of the decomposition module by the one or more processors causes the computing device to:
   partition pixels of a graphic design image into superpixels based on an analysis of respective colors of individual pixels of the graphic design image;
   group superpixels into components such that each component includes superpixels that are within a level of similarity from one another;
   categorize a component as text of the graphic design based on at least one text identification feature indicating consistency of a plurality of characters within the superpixels of the text component, wherein the text component is comprised of grouped superpixels based on the level of similarity of the superpixels rather than a contiguous connection between the superpixels; and
   a graphic design engine coupled with the one or more processors, wherein operation of the graphic design engine by the one or more processors enables the computing device to fulfill requests for suggested graphic designs from the database of decomposed graphic designs.

2. The computing device of claim 1, wherein the text identification features include one or more of:
   stroke width consistency within each component;
   average stroke width within each component;
   length of brush stroke within each component;
   orientation of text within each component;
   orientation consistency of each component;
   contrast of each component with respect to a background of the graphic design image;
   foreground color consistency within each component;
   background color consistency within each component;
   consistency of character sizes within each component;
   depth of each component in the graphic design image; and
   aspect ratio of each component.

3. The one or computing device of claim 2, wherein to categorize of the component based on the text identification features, further comprises application of a plurality of rules to the text identification features, wherein each of the plurality of rules is a product of binary criteria applied to the text identification features.

4. The computing device of claim 3, wherein individual rules of the plurality of rules are designed to identify one or more of:
   text that is smaller than a first predefined threshold of size;
   text that is larger than a second predefined threshold of size;
   text that is below a predefined threshold of contrast with a color of the background of the graphic design image; and
   connected text.

5. The computing device of claim 4, wherein a weight for each rule is determined using a support vector machine (SVM).

6. The computing device of claim 4, wherein the binary criteria is defined using covariance matrix adaptation (CMA).

7. The computing device of claim 4, further comprising:
   segmenting the text component by identifying individual pixels of the text component, the individual pixels precisely defining the plurality of characters within the superpixels of the text component.

8. A computer-implemented method for utilizing decomposed graphic designs comprising:
   partitioning pixels of a graphic design image into superpixels based on an analysis of respective colors of individual pixels of the graphic design image;
   grouping superpixels into components such that each component includes superpixels that are within a level of similarity from one another, wherein each component is grouped based on the level of similarity of the superpixels rather than a contiguous connection between the superpixels;
   categorizing a component as text of the graphic design based on at least one text identification feature indicating consistency of a plurality of characters within the superpixels of the text component;
   segmenting the text component by identifying individual pixels of the text component, the individual pixels precisely defining the plurality of characters within the superpixels of the text component; and
   utilizing a graphic design engine coupled with one or more processors, to enable a computing device to fulfill requests for suggested graphic designs from a database of decomposed graphic designs, including the segmented text component.

9. One or more computer-readable storage media having executable instructions stored thereon, which, in response to execution by a processor of a computing device cause the computing device to:
   partition pixels of a graphic design image into superpixels based on an analysis of respective colors of individual pixels of the graphic design image;
   group superpixels into components such that each component includes superpixels that are within a level of similarity from one another, wherein each component is grouped based on the level of similarity of the superpixels rather than a contiguous connection between the superpixels;
   categorize a component as text of the graphic design based on at least one text identification feature indicating consistency of a plurality of characters within the superpixels of the text component, wherein the text component is comprised of grouped superpixels based on the level of similarity of the superpixels; and operate a graphic design engine coupled with the one or more processors, wherein the operation of the graphic design engine by the one or more processors enables the computing device to fulfill requests for suggested graphic designs from a database of decomposed graphic designs.

* * * * *